(12) United States Patent
Zillmer et al.

(10) Patent No.: US 8,008,574 B2
(45) Date of Patent: Aug. 30, 2011

(54) PHOTO CELL WITH SPACED ANTI-OXIDATION MEMBER ON FLUID LOOP

(75) Inventors: Andrew J. Zillmer, Woodland Hills, CA (US); Bryan W. McEnerney, Woodland Hills, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 268 days.

(21) Appl. No.: 12/132,027

(22) Filed: Jun. 3, 2008

(65) Prior Publication Data
US 2009/0293938 A1 Dec. 3, 2009

(51) Int. Cl.
H02N 6/00 (2006.01)
H01L 35/28 (2006.01)
H01L 37/00 (2006.01)

(52) U.S. Cl. .................. 136/248; 136/206; 136/202

(58) Field of Classification Search .................. None
See application file for complete search history.

(56) References Cited

U.S. PATENT DOCUMENTS

| | | | |
|---|---|---|---|
| 3,533,850 A | 10/1970 | Tarneja | |
| 3,904,453 A | 9/1975 | Reveszaa | |
| 3,977,905 A | 8/1976 | Revesz | |
| 4,011,578 A | 3/1977 | Bollen | |
| 4,070,689 A | 1/1978 | Coleman | |
| 4,078,945 A | 3/1978 | Gonsiorawski | |
| 4,246,043 A | 1/1981 | Lindayer | |
| 4,750,943 A * | 6/1988 | Nelson | 136/253 |
| 5,080,724 A * | 1/1992 | Chubb | 136/253 |
| 6,375,812 B1 | 4/2002 | Leonida | |
| 6,709,483 B1 | 3/2004 | Hodgson | |
| 6,746,149 B1 * | 6/2004 | Chubb et al. | 374/161 |
| 7,217,472 B2 | 5/2007 | Leonida | |
| 7,261,798 B2 | 8/2007 | Mann | |

* cited by examiner

Primary Examiner — Alexa Neckel
Assistant Examiner — Shannon Gardner
(74) Attorney, Agent, or Firm — Carlson, Gaskey & Olds, PC

(57) ABSTRACT

A fluid tube routes a fluid adjacent to a source of heat to heat the fluid. The heated fluid is passed adjacent to cells which receive infrared radiation from the heated fluid. An anti-corrosion member is positioned on a portion of the tube adjacent to the cells. The anti-corrosion member is spaced from an outer periphery of the tube to provide a chamber between the portion of the tube and the anti-corrosion member.

16 Claims, 1 Drawing Sheet

PHOTO CELL WITH SPACED ANTI-OXIDATION MEMBER ON FLUID LOOP

BACKGROUND OF THE INVENTION

This application relates to a photo cell near which a hot fluid is passed, and wherein a tube for the fluid has an anti-oxidation member spaced away from the tube.

Photo cells, such as thermophotovoltaic cells, are known and are utilized to generate electricity. In typical applications, a hot fluid is looped between a source of heat to a location adjacent to the cells. Infrared radiation passes from the hot fluid to the cells, and the cells generate electricity, as known. The source of heat may be solar energy, a nuclear reactor, or other sources of heat.

One concern is that the tube for passing the fluid becomes quite hot, and is subject to oxidation, which will reduce the efficiency of the infrared radiation passing from the fluid to the cells. Oxidation will also result in degradation and potential rupture of the tube. Thus, it is known to coat the surfaces of the tube to prevent oxidation. Several known coatings have been proposed.

SUMMARY OF THE INVENTION

In a disclosed embodiment of this invention, fluid is passed from a source of heat through a tube, and adjacent to at least one cell which generates electricity from infrared radiation generated by the heated fluid. In a portion of the tube adjacent to the cell, an anti-oxidation member is positioned about the tube, but spaced from the tube. In one disclosed embodiment, the anti-oxidation member may be formed of yttrium aluminum garnet (YAG), magnesium aluminate (spinel), or aluminum oxynitride (AlON). Further, the space between the anti-oxidation member and the tube may be kept under a vacuum, or filled with an inert gas to provide better transference of the infrared radiation.

These and other features of the present invention can be best understood from the following specification and drawings, the following of which is a brief description.

DETAILED DESCRIPTION OF THE PREFERRED EMBODIMENT

Figure 1:
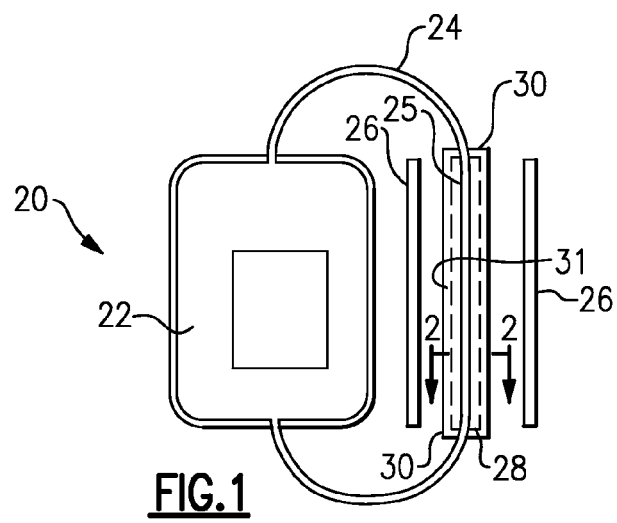
FIG. 1 schematically shows a first embodiment of this invention.

Electricity is generated by photo cells, such as shown schematically in FIG. 1. In the electrical generation system 20 as illustrated in FIG. 1, a nuclear reactor 22 generates heat. A fluid loop is formed by tube 24, which is typically a metal tube, passes through the nuclear reactor 22 to be heated. The hot fluid then passes adjacent to one or more photo cells 26. Infrared radiation generated by the hot fluid reaches the cells 26, and the cells generate electricity, as known. In the disclosed embodiment, surfaces of the tube 24 spaced away from the cells 26 may be coated to prevent oxidation, and may also be insulated to minimize heat loss.

Figure 2:
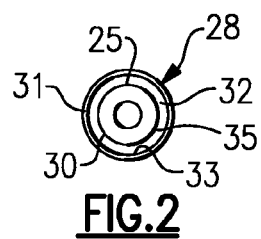
FIG. 2 is a cross-sectional view along line 2-2 of FIG. 1.
Figure 3:
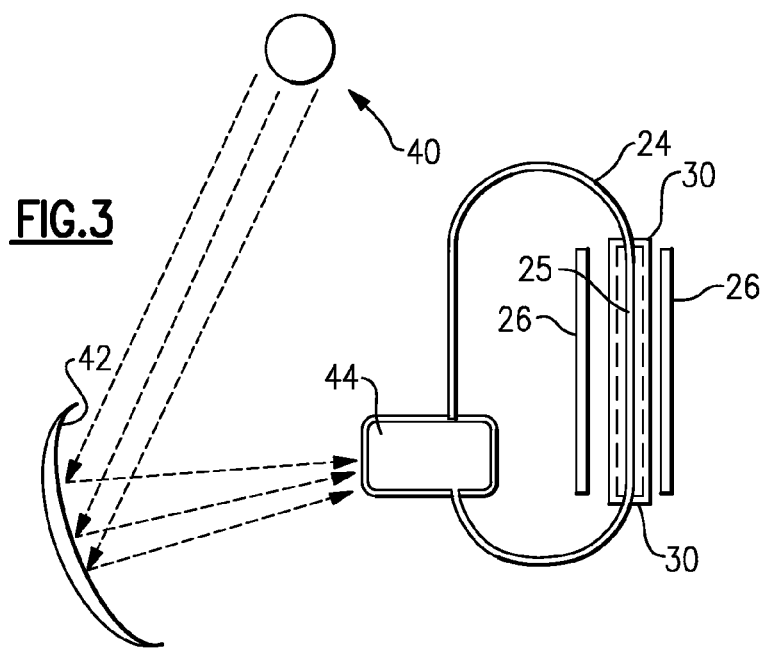
FIG. 3 shows a second embodiment.

An anti-oxidation or anti-corrosion member 28 is positioned about a portion 25 of the tube 24 which is adjacent to the cells 26. An inner wall 33 of an outer wall 31 is spaced about an outer wall 35 of the portion 25. Ends 30 close off the ends of the anti-oxidation member 28. Thus, as shown in FIG. 2, the portion 25 passes through a small opening in the end 30. The outer wall 31 is spaced from the portion 25 by a chamber 32. By providing the chamber 32, the amount of convection heat passing through the anti-oxidation member 28 is reduced, and the amount of radiation heat energy is maximized. The chamber 32 may be filled with an inert gas, or a vacuum may be drawn on the chamber 32.

In one disclosed embodiment, the anti-oxidation member 28 is cast from YAG, AlON, or magnesium aluminate.

In both embodiments, it is clear the tube 24, by providing a "fluid loop" returns the heated fluid from being adjacent to the cells, to the source of heat. As can be seen in both embodiments, the fluid tube 24 enters the chamber at one end 30 of the anti-corrosion member 28, and exits the chamber at an opposed end 30, such that the fluid tube 24 extends beyond the chamber, and the anti-corrosion member 28.

These systems have particular application in aerospace application, and in space. The anti-oxidation member provides good anti-corrosion protection of the portion 25, and at the same time ensures very efficient heat transfer and generation of infrared radiation.

YAG is particularly suitable for the anti-oxidation member, in that it is a chemically-stable oxide, and is relatively transparent to infrared radiation. It is also well suited for processing and manufacture, is creep-resistant, and is suited for a long-duration application in aggressive environments. Still, other materials, such as AlON and spinel, may be utilized. In particular, materials that are relatively transparent to radiation may be utilized, as AlON and spinel both can be made transparent with excellent transmissivity in the IR band.

If YAG is utilized, it could be single crystal or polycrystalline forms. The single crystal form is more expensive than the polycrystalline form, and thus polycrystalline may be more suitable for applications where attenuation levels are within tolerance. The polycrystalline YAG anti-oxidation member can be produced through conventional high purity sintering, or hot pressing operations.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A source of electricity comprising:
    a source of heat;
    a fluid tube for routing a fluid adjacent to the source of heat to heat the fluid, and for passing the heated fluid to be adjacent cells which receive infrared radiation from the heated fluid, and then returning the heated fluid through the tube to be adjacent to the source of heat; and
    an anti-corrosion member positioned on at least a portion of the tube that is adjacent to the cells, said anti-corrosion member being spaced from an outer periphery of the tube to provide a chamber between the portion of the tube and the anti-corrosion member.

2. The source as set forth in claim 1, wherein the anti-corrosion member has ends that close off the chamber, and an outer wall which has an inner periphery spaced from the outer periphery of the two to define the chamber.

3. The source as set forth in claim 2, wherein the chamber is filled with an inert gas.

4. The source as set forth in claim 2, wherein the chamber is mounted at a vacuum pressure.

5. The source as set forth in claim 1, wherein the cells are thermophotovoltaic cells.

6. The source as set forth in claim 1, wherein said anti-corrosion member is formed of one of yttrium aluminum garnet (YAG), aluminum oxynitride (AlON), and magnesium aluminate (spinel).

7. The source as set forth in claim 1, wherein the source of heat is a nuclear reactor.

8. The source as set forth in claim 1, wherein the source of heat is a solar receiver.

9. A fluid loop and infrared cell combination comprising:
a fluid tube for routing a fluid adjacent to a source of heat to heat the fluid, and for passing the heated fluid to be adjacent cells which receive infrared radiation from the heated fluid, and then returning the heated fluid through the tube to be adjacent to the source of heat; and
an anti-corrosion member positioned on at least a portion of the tube that is adjacent to the cells, said anti-corrosion member being spaced from an outer periphery of the tube to provide a chamber between the portion of the tube and the anti-corrosion member.

10. The combination as set forth in claim 9, wherein the anti-corrosion member has ends that close off the chamber, and an outer wall which has an inner periphery spaced from the outer periphery of the two to define the chamber.

11. The combination as set forth in claim 10, wherein the chamber is filled with an inert gas.

12. The combination as set forth in claim 10, wherein the chamber is maintained at a vacuum pressure.

13. The combination as set forth in claim 9, wherein the cells are thermophotovoltaic cells.

14. The combination as set forth in claim 9, wherein said anti-corrosion member is formed of one of yttrium aluminum garnet (YAG), aluminum oxynitride (AlON), and magnesium aluminate (spinel).

15. The source as set forth in claim 2, wherein said fluid tube enters said chamber at one end of said anti-corrosion member, and exits said chamber at an opposed end, such that said fluid tube extends beyond said chamber.

16. The combination as set forth in claim 10, wherein said fluid tube enters said chamber at one end of said anti-corrosion member, and exits said chamber at an opposed end, such that said fluid tube extends beyond said chamber.

* * * * *